June 9, 1964 O. W. SEPP, JR 3,136,508
PARACHUTE
Filed Oct. 26, 1962 3 Sheets-Sheet 1
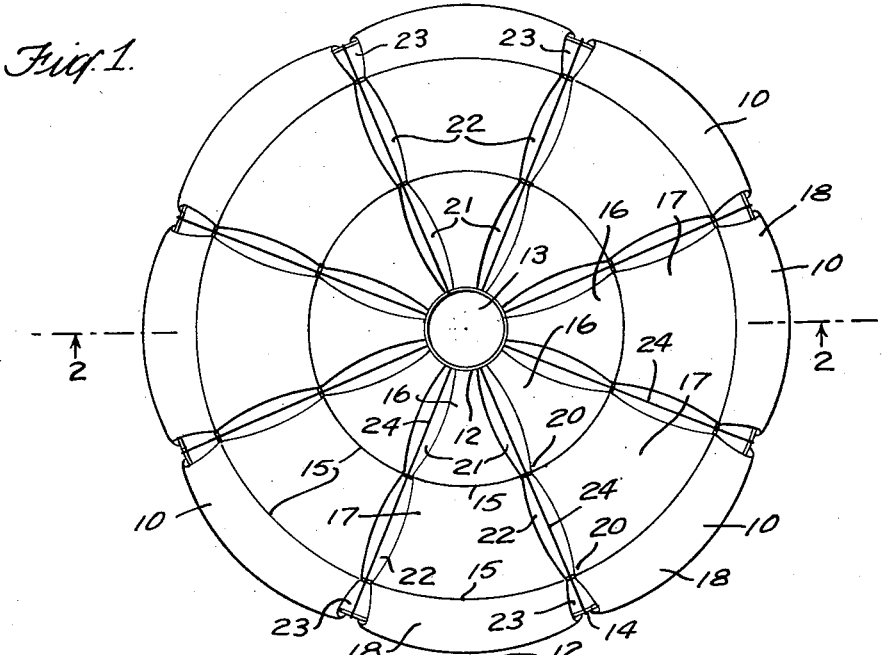
Fig. 1.
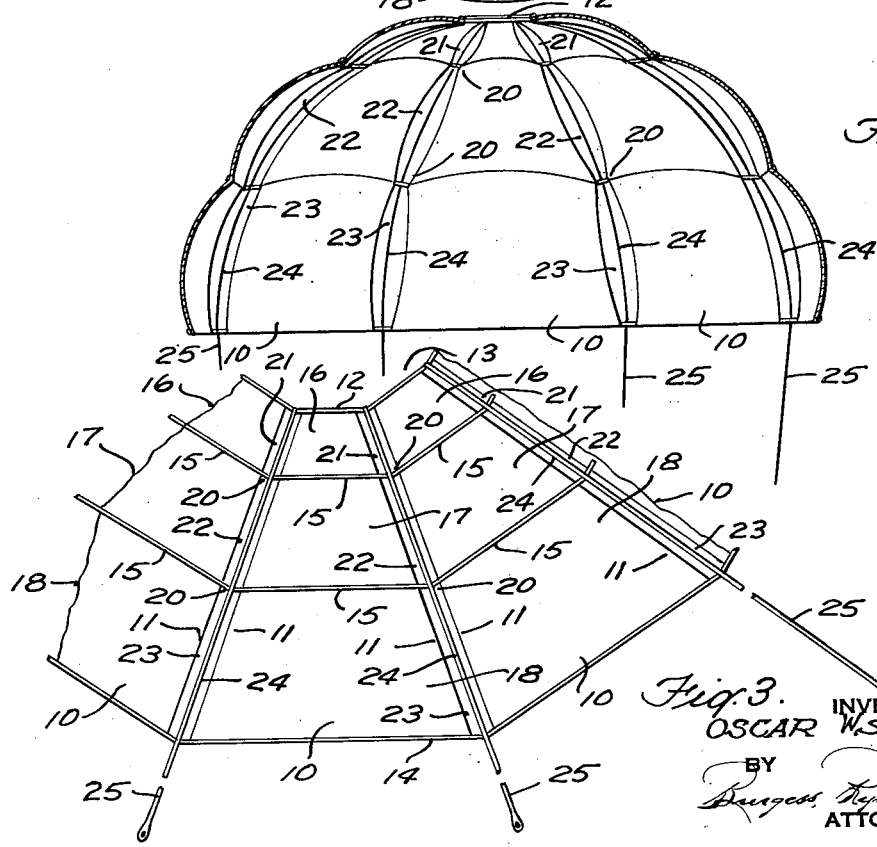
Fig. 2.
Fig. 3.
INVENTOR
OSCAR W. SEPP, JR.
BY
ATTORNEYS June 9, 1964   O. W. SEPP, JR   3,136,508
PARACHUTE
Filed Oct. 26, 1962   3 Sheets-Sheet 2
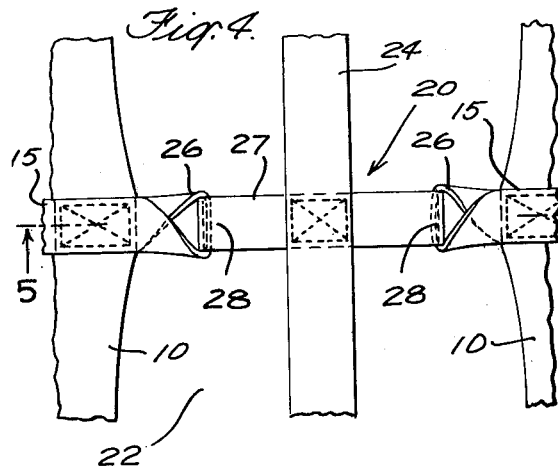
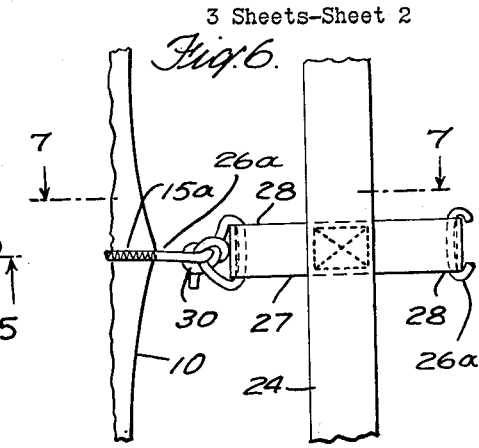
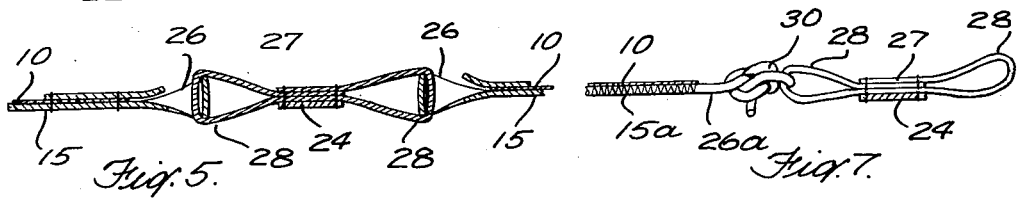
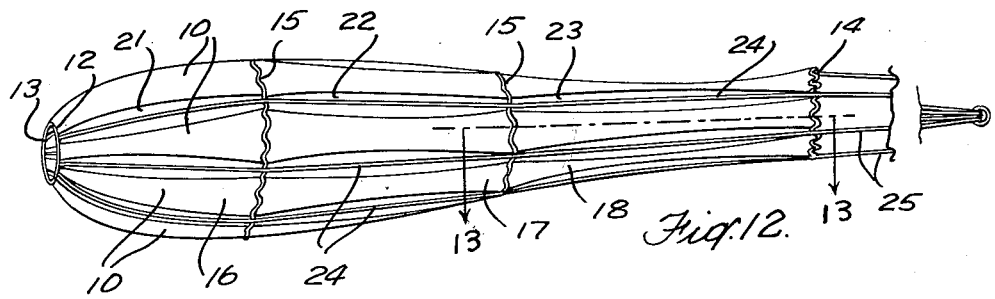
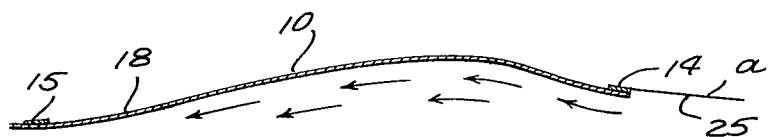
INVENTOR
OSCAR W. SEPP, JR.
BY
ATTORNEYS June 9, 1964     O. W. SEPP, JR     3,136,508
PARACHUTE
Filed Oct. 26, 1962     3 Sheets-Sheet 3
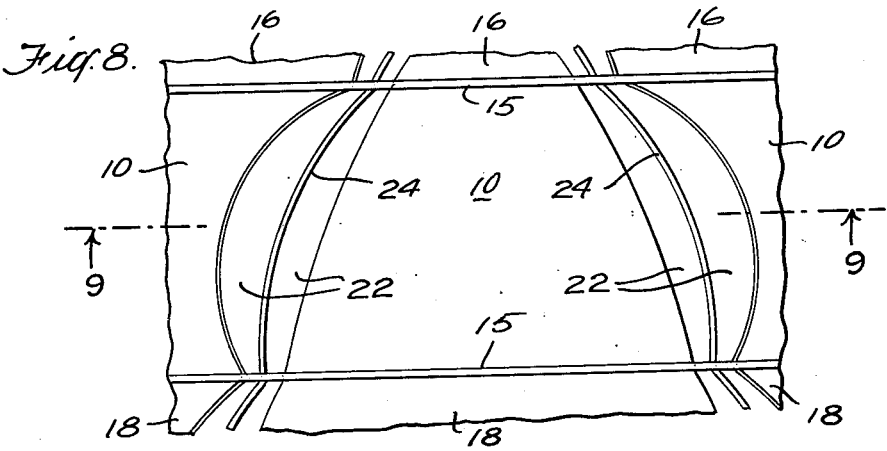
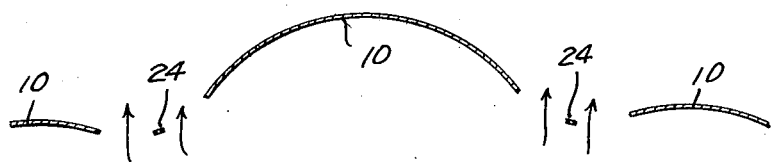
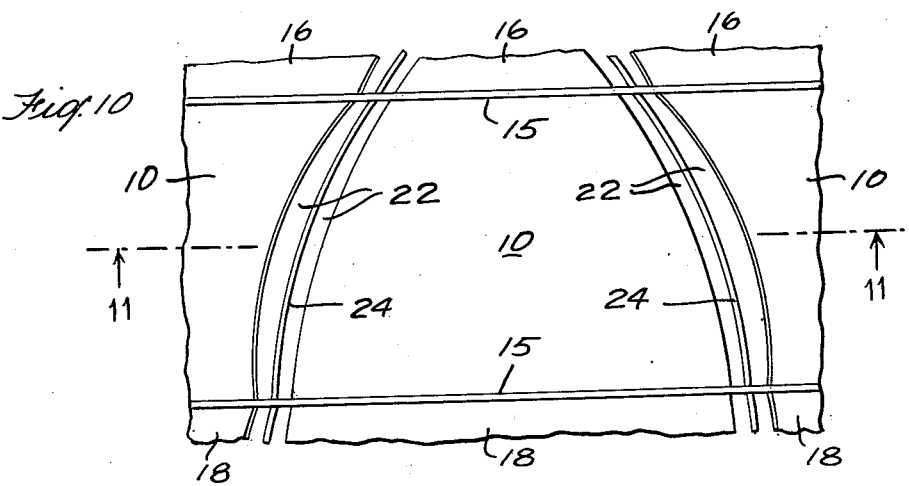
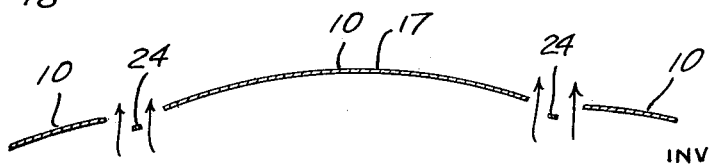
INVENTOR
OSCAR W. SEPP, JR.
BY
ATTORNEYS

United States Patent Office 3,136,508
Patented June 9, 1964

3,136,508
PARACHUTE
Oscar W. Sepp, Jr., Merrick, N.Y., assignor to M. Steinthal & Co., Inc., New York, N.Y., a corporation of New York
Filed Oct. 26, 1962, Ser. No. 233,388
7 Claims. (Cl. 244—145)

The present invention relates to parachutes.

Among the objects of the present invention are provided a new and improved parachute which is safe and reliable, which will open quickly, smoothly and orderly, which is designed to automatically control its geometric porosity during use according to the air pressure exerted on the canopy of the parachute and which is constructed to permit easy replacement of any of its gores damaged, as for example, by ground scraping, contact with foreign objects, mishandling and general wear.

As a feature of the present invention, the canopy of the parachute is made up of a series of separate gores, secured together side by side in such a way as to form vertical slots, which open up under the action of air passing therethrough to form vent openings. The widths of the slots automatically vary according to the pressure of the air passing therethrough, and this air pressure, in turn, depends on the speed of the parachute. The extent of porosity of the canopy is thereby automatically controlled according to the speed of the parachute.

Various other objects, and features of the invention are apparent from the following description and from the accompanying drawings, in which—

FIG. 1 is a top plan outside view, somewhat diagrammatic, of the inflated parachute canopy embodying the present invention;

FIG. 2 is a radial section of the inflated parachute canopy taken on lines 2—2 of FIG. 1;

FIG. 3 is a plan view, somewhat diagrammatic, of an outside section of the parachute canopy laid out flat to show its gore design and construction;

FIG. 4 is a detail elevational view of part of the parachute canopy showing one form of gore attachment to a radial line of the canopy, in accordance with the present invention;

FIG. 5 is a section of the parachute canopy taken on lines 5—5 of FIG. 4;

FIG. 6 is a detail elevational view of the parachute canopy showing another form of gore attachment to the radial line of the canopy, in accordance with the present invention;

FIG. 7 is a section of the parachute canopy taken on lines 7—7 of FIG. 6;

FIG. 8 is an elevational detail view of the inflated parachute canopy under conditions of high speed travel of the parachute;

FIG. 9 is a section of the inflated canopy under conditions of high speed travel of the parachute, taken on lines 9—9 of FIG. 8;

FIG. 10 is an elevational detail view of the inflated parachute canopy under conditions of low speed travel of the parachute;

FIG. 11 is a section of the inflated parachute canopy under conditions of low speed travel of the parachute, taken on lines 11—11 of FIG. 10;

FIG. 12 is a side elevational view of the parachute canopy taken after deployment and as the canopy starts to inflate; and FIG. 13 is a section of the parachute canopy taken on lines 13—13 of FIG. 12 and showing the air flow lines in connection therewith.

For the sake of simplicity, the construction of the parachute canopy embodying the present invention is shown in the drawings somewhat diagrammatic and the usual parachute refinements, such as reinforcements, stitchings, etc. are not all shown.

Referring to FIG. 3 of the drawings, the parachute canopy comprises a series of equally spaced, similarly shaped gores 10, made of a strong woven fabric, such as nylon. Each of these gores 10, when in the flat condition shown in FIG. 3, is in the shape of a quadrilateral, having straight equally opposite sides 11 and tapering towards the apex of the canopy. The gores 10 are connected together at the apex by a common vent ring or band 12 extending around the full circumference of the canopy to define a vent 13 at the apex and are connected together at the bottom by a common skirt ring or band 14 extending around the full circumference of the canopy. The gores 10 have horizontal lines 15 in the form of tapes, ribbons or cords, reinforcing the gores and dividing each gore into a number of panels 16, 17 and 18. Only three panels 16, 17 and 18 in each gore 10 are shown, but it must be understood that the gores can be made up of any number of panels according to the size and design of the canopy.

The panels 16, 17 and 18 in each gore 10 are similar to the panels 16, 17 and 18 respectively of the adjacent gore 10 and the horizontal lines 15 in each gore is in circumferential alignment with the horizontal lines 15 in the adjacent gore, when the canopy is inflated.

Adjacent gores 10 are secured together at their sides at the ends of the horizontal lines 15 by means of panel attachments 20 to define slots 21, 22 and 23 between adjacent panels 16, 17 and 18 of adjacent gores 10 serving as air vents. The means for forming these panel attachments 20 comprises a series of radial lines 24 in the form of tapes, ribbons or cords between the adjacent gores 10 secured at their upper ends to the vent ring or band 12 and secured at respective lower sections to the skirt ring or band 14. These radial lines 24 serve as reinforcements for the canopy, serve as part of the means for connecting adjacent gores 10 together at spaced points to form the panel attachments 20 at said points and extend below the skirt band 14 to form suspension lines 25. The adjacent ends of adjacent horizontal lines 15 in adjoining gores 10 are secured to the radial lines 24 in a manner which will permit replacement of a damaged or worn gore 10, without destroying the other gore 10. In the construction of FIGS. 4 and 5, the horizontal lines 15 are shown in the form of ribbons having end extensions formed into loops 26 by stitching and the radial lines 24 have ribbon tabs 27 stitched thereto and forming double loops 28 extending from opposite sides thereof and interlinked with the loops 26. When replacement of a damaged or worn gore 10 is required, it is an easy matter to cut the loops 26 and substitute another gore therefor.

In the construction of FIGS. 6 and 7, the horizontal lines 15a corresponding to the horizontal lines 15 in the embodiment of FIG. 1, are in the form of ribbons, cords or ropes, having cord extensions 26a threaded through the loops 28 and tied thereto by a firm knot 30. With this construction, replacement of a damaged or worn gore 10 requires less effort than is required with the construction of FIGS. 4 and 5.

In replacing a gore 10, the continuous vent band 12 and the continuous skirt band 14 may be severed, and after replacement of the gore, the repaired bands may be repaired by means of connecting webs extending across the juncture between the ends of the band where they have been severed and stitched to said bands. If desired, however, the vent band 12 and the skirt band 14 need not be continuous in the form of common rings for the gores 10, but may be discontinuous, as in the case of the horizontal lines 15 and may be made up of a series of sections, each forming part of the corresponding individual gore 10 and secured to the radial lines 24 by panel attachments similar to the panel attachments 20 described in connection with the embodiments of FIGS. 4 to 7.

In a conventional high speed parachute, as for example, those having ring slots or those of the ribbon type composed of circular concentric spaced bands, the erratic behavior of the leading edges of the bands encountering the air streams flowing into the canopy, disrupts the air flow during inflation, and causes fluttering of the canopy and consequent weakening of the parachute.

In the construction of the present invention, the gores 10 in the parachute canopy present continuous surfaces from the skirt to the vent after deployment of the parachute and while the canopy is being inflated, so that the air stream passes through the canopy smoothly along the surfaces of the gores as shown in FIGS. 12 and 13. As a result, the canopy of the present invention will open up quickly, smoothly and stably while maintaining its required porosity under automatic control.

When the canopy is fully inflated as shown in FIGS. 1 and 2, the slots 21, 22 and 23 will open up into air vents of double convex shape connected together end to end at panel attachment points serving as nodes for said slots, and the width of these air vents varies according to the pressure of the air passing therethrough. At high speed, when greater porosity of the canopy is required to prevent injury to the canopy and to permit said canopy to travel at such speeds, the air acting on the canopy and passing through the expanded slots 21, 22 and 23 with corresponding high pressure, causes the slots to open up and to present vent openings of corresponding areas to the flow of air therethrough, so that the porosity of the canopy increases, as shown in FIGS. 8 and 9. At lower speeds, the resulting low pressure of the air acting on the canopy and passing through the slots 21, 22 and 23, causes the slots to open up into vent openings but to a lesser extent, as shown in FIGS. 10 and 11, thereby correspondingly decreasing the porosity of the canopy.

It is seen, therefore, that the porosity of the parachute is automatically controlled according to the speed of travel of the parachute.

While the invention has been described with particular reference to specific embodiments, it is to be understood that it is not to be limited thereto but is to be construed broadly and restricted solely by the scope of the appended claims.

What is claimed is:

1. A parachute canopy comprising a series of slots extending substantially radially of the canopy, said slots opening up under pressure to serve as air vents when said canopy is in use, the widths of said slots varying automatically according to the air pressure, to present air vents of increasing areas as the air pressure increases, said canopy comprises a series of gores extending from the apex to the skirt and tapering towards the apex, a radial line located between each pair of adjoining gores, and extending from the apex to the skirt, and means connecting said adjoining pair of gores to said radial line at spaced points to form between said points said radial slots.

2. A parachute canopy comprising a series of slots extending substantially radially of the canopy, said slots opening up under pressure to serve as air vents when said canopy is in use, the widths of said slots varying automatically according to the air pressure, to present air vents of increasing areas as the air pressure increases, said canopy comprising a series of gores extending from the apex to the skirt and tapering towards the apex, a radial line located between each pair of adjoining gores and extending from the apex to the skirt, tab loops extending from opposite sides of said radial line at spaced points along said radial line, and means connecting said adjoining pair of gores to said radial line at said spaced points to form between said points said radial slots.

3. A parachute canopy comprising a series of slots extending substantially radially of the canopy, said slots opening up under pressure to serve as air vents when said canopy is in use, the widths of said slots varying automatically according to the air pressure, to present air vents of increasing areas as the air pressure increases, said canopy comprising a series of gores extending from the apex to the skirt and tapering towards the apex, each of said gores having a plurality of horizontal reinforcing lines extending thereacross and dividing said gore into panels, the ends of the lines in adjacent gores being in substantial alignment and constituting panel attachment points, a radial line located between each pair of adjoining gores and extending from the apex to the skirt, and means connecting said adjoining pair of gores to said radial line at said attachment points to form between said points said radial slots.

4. A parachute canopy as described in claim 3, said connecting means comprising tab loops secured to said radial line and extending from opposite sides of said radial line at said attachment points, and securing means connected to the ends of said horizontal lines and interlinked with said loops.

5. A parachute canopy as described in claim 1, said connecting means comprising tab loops secured to said radial lines and extending from opposite sides of said radial line at said spaced points, and loops connected to said adjacent gores at said spaced points and interlinked with said tab loops.

6. A parachute canopy as described in claim 1, said connecting means comprising tab loops secured to said radial line and extending from opposite sides of said radial line at said spaced points, and cords connected to said adjacent gores at said spaced points and tied to said loops.

7. A parachute canopy comprising a series of slots extending substantially radially of the canopy, said slots opening up under pressure to serve as air vents when said canopy is in use, the widths of said slots varying automatically according to the air pressure, to present air vents of increasing areas as the air pressure increases, said canopy comprising a series of gores extending from the apex to the skirt and tapering towards the apex, a radial line located between each pair of adjoining gores, and extending from the apex to the skirt, said radial line extending below the skirt of the canopy to define a suspension line for the canopy, and means connecting said adjoining pair of gores to said radial line at spaced points to form between said points said radial slots.

References Cited in the file of this patent

UNITED STATES PATENTS

| | | |
|---|---|---|
| 1,862,247 | Tricau | June 7, 1932 |
| 2,384,416 | Derry | Oct. 4, 1945 |
| 2,641,424 | Moran | June 9, 1953 |

FOREIGN PATENTS

| | | |
|---|---|---|
| 978,042 | France | Nov. 22, 1950 |
| 1,154,522 | France | Nov. 4, 1957 |